United States Patent [19]

Bonaccorsi et al.

[11] Patent Number: 5,042,990

[45] Date of Patent: Aug. 27, 1991

[54] STABILIZER AND FLUIDIFIER ADDITIVES FOR DISPERSIONS OF COAL IN WATER

[75] Inventors: Fabrizio Bonaccorsi, Leghorn; Aldo Prevedello; Armando Marcotullio, both of San Donato Milanese; Edoardo Platone, Asti; Arnaldo Roggero, San Donato Milanese; Elio Donati, Fano, all of Italy

[73] Assignee: Eniricerche S.p.A.-and- Snamprogetti S.p.A., Milan, Italy

[21] Appl. No.: 441,265

[22] Filed: Nov. 27, 1989

[30] Foreign Application Priority Data

Nov. 28, 1988 [IT] Italy ................................ 22759 A/88

[51] Int. Cl.$^5$ ............................................... C01L 5/00
[52] U.S. Cl. ...................................... 44/280; 44/388; 44/424; 44/443
[58] Field of Search ..................... 44/51, 62, 280, 443, 44/388, 424; 525/242, 286, 333.3

[56] References Cited

U.S. PATENT DOCUMENTS

| 3,070,574 | 12/1962 | Kastning et al. | 525/242 |
| 3,235,626 | 2/1966 | Waack | 525/242 |
| 3,492,369 | 1/1970 | Naylor | 525/333.3 |
| 3,666,737 | 5/1972 | Lal et al. | 525/286 |
| 3,817,967 | 6/1974 | Mace et al. | 525/333.3 |
| 3,928,302 | 12/1975 | Hargis et al. | 525/242 |
| 3,978,160 | 8/1976 | Seiler et al. | 525/333.3 |
| 4,173,693 | 11/1979 | Au et al. | 525/329 |
| 4,217,109 | 8/1980 | Siwersson et al. | 44/90 |
| 4,242,098 | 12/1980 | Braun et al. | 44/51 |
| 4,358,293 | 11/1982 | Mark | 44/77 |
| 4,477,259 | 10/1984 | Funk | 44/51 |
| 4,477,260 | 10/1984 | Funk | 44/51 |
| 4,501,594 | 2/1985 | Marcellis et al. | 44/51 |
| 4,539,136 | 9/1985 | Broekhuis | 525/250 |
| 4,915,708 | 4/1988 | Prevedello et al. | 44/280 |

FOREIGN PATENT DOCUMENTS 2333307 10/1974 Fed. Rep. of Germany ...... 525/286

Primary Examiner—Margaret B. Medley
Attorney, Agent, or Firm—Oblon, Spivak, McClelland, Maier & Neustadt

[57] ABSTRACT

Storage-stable, pumpable, concentrated dispersions of coal in water contain a non-ionic additive constituted by a polymer containing polyethoxy chains grafted onto suitably functionalized polystyrenes having a molecular weight comprised within the range of from 500 to 15000.

6 Claims, No Drawings

STABILIZER AND FLUIDIFIER ADDITIVES FOR DISPERSIONS OF COAL IN WATER

The present invention relates to stable and pumpable, concentrated dispersions of coal in water and to a stabilizer and fluidifier additive suitable for that purpose.

At present, power production is mostly based on the combustion of either liquid or gaseous fuels, such as petroleum and natural gas. The use of coal for such a purpose, meets with difficulties deriving from transport, storage and combustion of said material. Therefore, in considering the large availability of coal, and the large extraction capacity, much effort is being directed to the search for techniques for transforming coal into a more useful power source. Thus, e.g., the coal gasification (destructive distillation), as well as coal liquefaction (high-pressure hydrogenation) techniques have been explored.

According to a further technique, coal, in the form of solid particles, is dispersed in a liquid medium in order to form a dispersion, in particular an aqueous dispersion. Relatively to coal as such, such an aqueous dispersion can make it possible to achieve considerable technical advantages, in that said dispersion is easier to store and transport, and with a lower ecological impact on the environment, than coal as such.

Furthermore, providing coal in a fluid form may make it possible the same coal to be burnt without a preliminary water separation, on a similar equipment to that used for burning fuel oil.

However, in order to practically achieve such advantages, high-coal-content, homogeneous coal dispersions are required, which are stable (i.e., nonsettling) after a certain storage time, as well as fluid and pumpable, in order to make it possible for them to be conveyed inside pipes and atomized inside the combustion chamber.

In order to satisfy the transport and combustion requirements, the operators have mostly worked in the art by controlling the size and size distribution of coal particles in the dispersion, and adding to the same dispersions additive$ capable of providing it with characteristics of storage stability and/or pumpability.

The proposed additives belong to several compound classes, e.g.: thickener additives, such as xanthan gum, guar gum derivatives and poly-ethylene-oxide (U.S. Pat. No. 4,242,098); fluidifier additives of anionic type, such as ammonium or alkali-metal salts of polycarboxy acids, or polyphosphates (U.S. Pat. No. 4,217,109); polyoxyalkylenic, non-ionic fluidifier additives, or fluidifier additives constituted by naphthalenesulfonic acid-formaldehyde condensates (U.S. Pat. No. 4,358,293).

The main drawback of the additives of the prior art consists in their substantial incapability to produce high-coal-content dispersions of coal in water, which are simultaneously stable to storage, and endowed with transport-suitable fluidity values.

Furthermore, various non-ionic additives of polyoxyalkylene type are unable to produce stable aqueous suspensions, when they are added to coal during the step of wet-grinding of the same coal.

An object of the present invention is overcoming the drawbacks which affect the prior art, as they are hereinabove briefly mentioned.

More particularly, an object of the present invention is an additive capable of giving characteristics of stability (absence of settling) and of fluidity (flowability) to aqueous coal dispersions having a high coal content.

A further object of the present invention is a process for preparing such a stabilizer and fluidifier additive.

Another object of the present invention are the dispersions of coal in water which contain said stabilizer and fluidifier additive.

Still another object of the present invention is a process for preparing said dispersions, which comprises the wet-grinding of coal, in the presence of the additive.

Further objects of the invention will be clear from the following disclosure.

The stabilizer and fluidifier additive according to the present invention is a polymer having polyethoxy chains grafted onto suitably functionalized polystyrenes having an average molecular weight comprised within the range of from 500 to 15 000, and preferably comprised within the range of from 1000 to 11 000.

The structural formula of such a polymer is as follows:

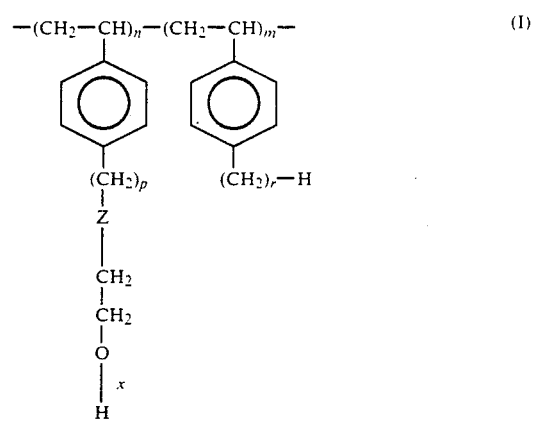

wherein:

Z is either —O— or —NH— or —COO—, x is an integer comprised within the range of from 60 to 250, p is an integer comprised within the range of from 0 to 6, r is an integer comprised within the range of from 0 to 4, n and m are integers whose sum n+m has a value comprised within the range of from 4 to 128, and preferably comprised within the range of from 8 to 93, and for which the ratio of n/(n+m) is comprised within the range of from 0.25 to 0.6, and is preferably comprised within the range of from 0.3 to 0.5.

The fluidifier additive schematically described by the formula (I) can be obtained by reacting with ethylene oxide a randomly functionalized poly-p-alkyl-styrene, preferably poly-p-methyl-styrene, or a randomly functionalized polystyrene. Such functionalized polymers can be schematically represented by the following formula:

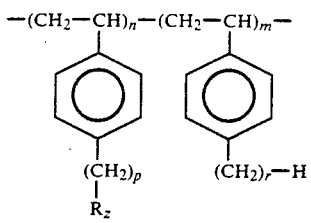

(II)

wherein, analogously to preceding formula (I), p is an integer comprised within the range of from 0 to 6, r is an integer comprised within the range of from 0 to 4, n and m are integers whose sum n+m has a value comprised within the range of from 4 to 128, and preferably comprised within the range of from 8 to 93, and for which the ratio of n/(n+m) is comprised within the range of from 0.25 to 0.6, and is preferably comprised within the range of from 0.3 to 0.5, and $R_z$ is —OH, or —COOH, or —NH$_2$.

This reaction is suitably carried out by operating in the absence of solvents or diluents, in the presence of alkaline catalysts, by feeding ethylene oxide to the functionalized poly-p-alkyl-styrene, or to the functionalized polystyrene, with the reaction temperatures being kept within the range of from 140 to 180° C.

Basic catalysts suitable for the intended purpose are alkali-metal or alkali-earth-metal oxides, hydroxides, carbonates and alkoxides.

Among these, the alkali-metal hydroxides, in particular potassium hydroxide, are preferred.

The amount of catalyst can be comprised within the range of from 0.1 to 2.0 parts by weight per each 100 parts by weight of polymer.

The ratio of the reactants to each other depends on the amount of ethylene oxide which one wants to link to each hydroxy group contained in the polymer, considering that, under the above stated conditions, the reaction proceeds up to completion, or substantial completion, within a time of the order of 2-4 hours.

Finally, the reaction mass is cooled, and the stabilizer and fluidifier additive is recovered and can be used as such, with no need for any further purification.

The so obtained additive is a water-soluble solid.

The functionalized poly-p-methyl-styrenes or the functionalized polystyrenes schematically represented by the formula (II) can be prepared according to several synthesis routes.

Some of these preparation processes are now listed; for the relevant details, reference should be made to the hereunder specified references.

(a) Partial metallation of polystyrene (a$_1$)

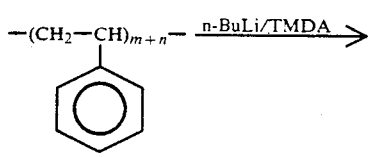

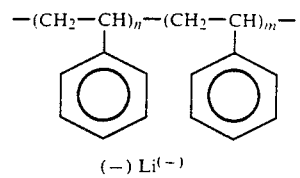

or of poly-p-methyl-styrene (a$_2$)

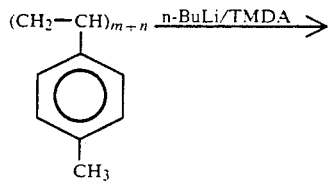

wherein:

n-BuLi=n-butyl-lithium;

TMDA=tetramethyl-ethylene-diamine.

the partial metallation is followed by one of the following reactions:

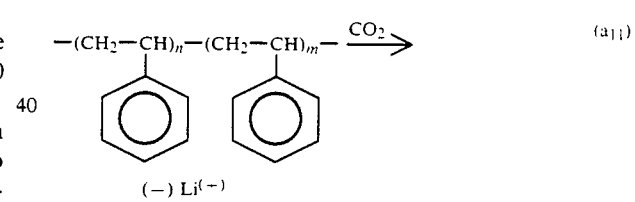

(a$_{11}$)

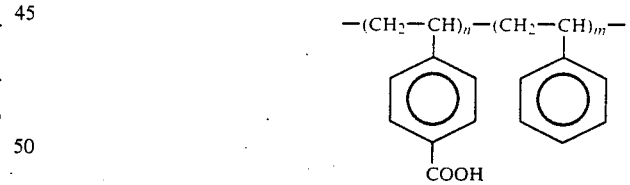

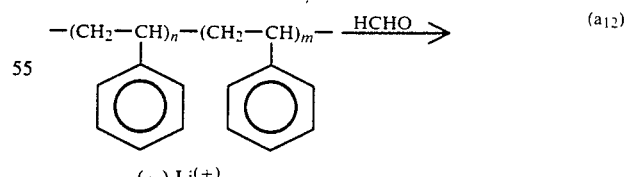

(a$_{12}$)

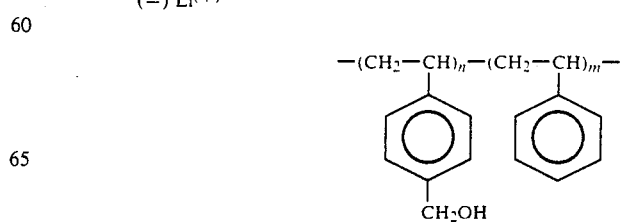

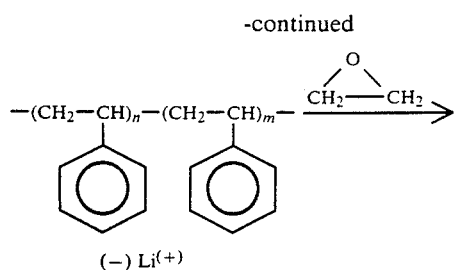 (a₁₃)

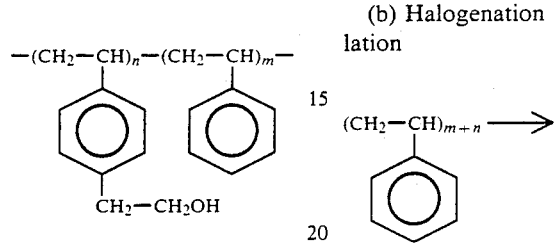

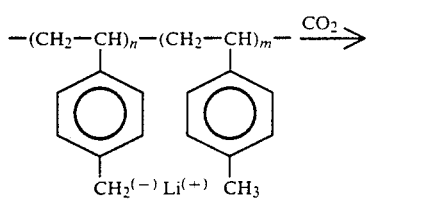 $\xrightarrow{CO_2}$ (a₂₁)

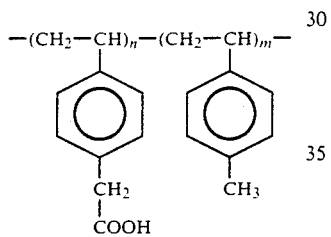

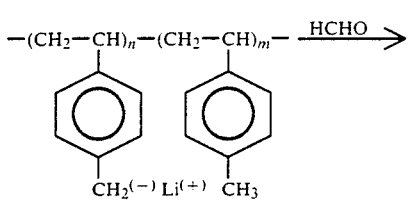 $\xrightarrow{HCHO}$ (a₂₂)

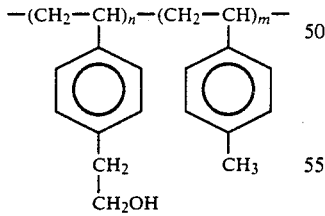

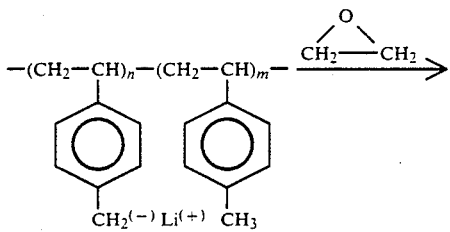 (a₂₃)

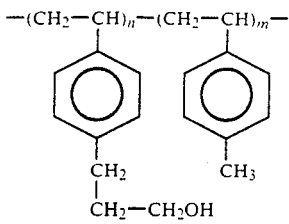

(b) Halogenation of polystyrene, followed by metallation $(CH_2-CH)_{m+n}$ ⟶

$-(CH_2-CH)_n-(CH_2-CH)_m-$ $\xrightarrow{n\text{-BuLi}}$ (with A substituent)

$-(CH_2-CH)_n-(CH_2-CH)_m-$ (—) Li⁽⁺⁾ wherein A = Br, I, Cl.

The metallation is followed by one of the reactions (a₁₁), (a₁₂), (a₁₃) as already schematically shown hereinabove.

(c) Polystyrene chloromethylation $(CH_2-CH)_{m+n}$ ⟶

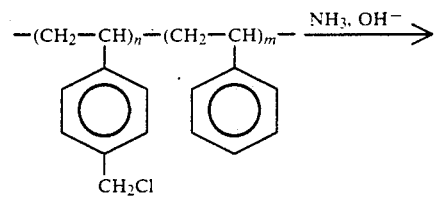 $\xrightarrow{NH_3, OH^-}$

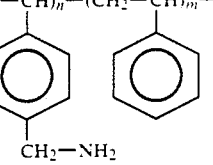

(d) Polystyrene nitration, followed by a reduction

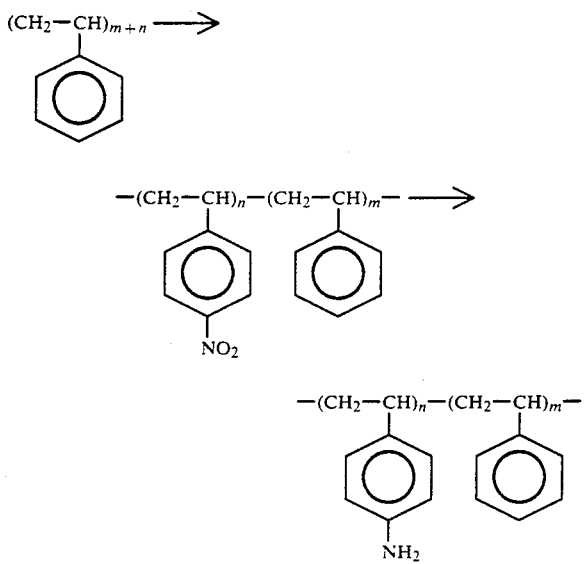

References

M. J. Farral, M. T. Frechet, J. Org. Chem. 41 3877 (1976)

"High Polymers", XIX$^{th}$ volume: "Chemical Reactions of Polymers", E. M. Fettes - Interscience Publishers D. E. Bergbreiter, J. M. Killough "Organic coating and Plastics Chemistry" 41$^{st}$ Volume, pages 213-219 (1979)

J. Heller, Polymer Engineering and Science, 11$^{th}$ Volume, No. 1, pages 6-10, (1971)

Encyclopaedia of Polymer Science and Engineering", 2$^{nd}$ Edition, 3$^{rd}$ Volume, pages 363-381 (1985)

Ditto, 12$^{th}$ Volume, pages 618-658 (1987).

According to a further feature thereof, the present invention relates to aqueous dispersions of coal containing the above disclosed additive. More particularly, said dispersions can contain from 60 to 75% by weight of coal solids with a particle size generally equal to, or lower than, 300 μm, and from 0.3 to 0.9% by weight of the stabilizer and fluidifier additive according to the present invention, with the residual percentage being constituted by water.

In the preferred form of practical embodiment, the coal solids are contained in an amount of the order of from 68 to 72% by weight, and the additive content is comprised within the range of from about 0.4 to 0.7% by weight.

The aqueous dispersions of coal solids can be prepared by means of the normal processes known in the art. However, in a preferred form of practical embodiment, the dispersions are prepared by means of a process which comprises the following treatments:

(a) pre-grinding of coal under dry conditions in order to produce a pre-ground coal with a maximum particle size of about 6 mm;

(b) wet grinding of a portion of the pre-ground coal, carried out in the presence of the stabilizer and fluidifier additive, in order to produce an aqueous dispersion of micronized coal solids, with an average size of the particles of the order of from 6 to 12 μm;

(c) addition of the residual portion of pre-ground coal to said dispersion, and obtainment of the resulting dispersion with a finishing mill, possibly followed by a step of homogenization in a suitable mixer.

In the preparation of the dispersions according to the present invention, any type of coal can be used, whether of low or of high quality, sub-bituminous or bituminous coals, or anthracite, after being possibly submitted to preliminary treatments having the purpose of removing their contents of inert matters (beneficiation).

In any case, aqueous dispersions are obtained, with a high solid content, which are stable to storage for industrially useful time periods, and are fluid enough to make it possible for them to be conveyed by pumping through pipes.

The following experimental examples are illustrative and non-limitative of the purview of the present invention.

EXAMPLE 1

Preparation of the Fluidifier-Stabilizer Additive
Preparation of ply-p-methyl-styrene (PMS)

200 ml of anhydrous cyclohexane containing 500 ppm of anhydrous THF and 20 g (169 mmol) of anhydrous p-methyl-styrene were charged under an inert blanketing atmosphere to a reactor of 1 litre of capacity equipped with mechanical stirring means. The suitable amount of n-BuLi, solution in hexane, was then added at 40-50° C. to the so obtained solution, with this latter being kept vigorously stirred. The reaction mixture was then kept 2 hours at the temperature of 60° C. PMS was isolated and purified by precipitation from methanol. By suitably varying the amount of n-BuLi, PMS's having different values of number average molecular weight ($\overline{Mn}$) were prepared (see Table 1).

Preparation of functionalized p-methyl-styrenes

Two different methodologies were used, as a function of the amount of p-hydroxyalkyl groups contained in the polymer, above all as regards the step of isolation of OH-functionalized PMS's.

Preparation of functionalized p-methyl-styrene having a content of p-hydroxy-propyl groups lower than 15%

10 g of PMS (84.8 mmol of monomer) and 600 ml of anhydrous cyclohexane were charged to a flask of 1 litre of capacity, equipped with mechanical stirring means and with a condenser; the polymer was then thoroughly dehydrated after a preliminary azeotropic distillation of about 240 ml of solvent. The suitable amount of metallating agent (see Table 1), constituted by a solution in cyclohexane of n-butyllithium and tetramethylethylenediamine (TMDA) in an equimolecular ratio, was then added to the polymer solution at room temperature. The reaction mixture was then kept at 60° C. for a 2-hour time period. Ethylene oxide gas was then slowly bubbled at room temperature through the solution in cyclohexane of the so obtained anion, until the colour of the reaction mixture disappeared. After 1 hour of further stirring, the reaction was quenched with methanol and the polymer was isolated and purified by means of repeated precipitations from methanol.

Preparation of functionalized p-methyl-styrenes having a content of p-hydroxy-alkyl groups higher than 15%

10 g of PMS (84.8 mmol of monomer) and 600 ml of anhydrous cyclohexane were charged to a flask of 1 litre of capacity, equipped with mechanical stirring means and with a condenser; the polymer was then thoroughly dehydrated after a preliminary azeotropic distillation of about 240 ml of solvent. The suitable amount of metallating agent (see Table 1), constituted by a solution in cyclohexane of n-butyllithium and tetramethylethylenediamine (TMDA) in an equimolecular ratio, was then added to the polymer solution at room temperature. When such a reaction mixture is kept at 60° C. for a 2-hour time period, a red precipitate is formed, which is constituted by the metallated polymer. Ethylene oxide gas was then slowly bubbled with vigorous stirring through the so obtained heterogeneous mixture, cooled down to room temperature, until the red colour of the precipitate disappeared. After 1 hour of further stirring, methanol and methylene chloride were added to the reaction mixture, until solid precipitate was totally dissolved. After concentration under reduced pressure, the residue was dissolved in methylene chloride and the so obtained solution was washed three times with acidic water and was then dried over anhydrous $Na_2SO_4$. The polymer was then isolated and purified by means of repeated precipitations from petroleum ether of 40–70° grade.

Preparation of the polymer having polyethoxy chains grafted onto suitably functionalized polystyrene The functionalized polymer, selected from the group consisting of both of the hereinabove stated functionalized polymers, is charged to an autoclave of 1 litre of capacity, equipped with magnetic-driven stirring means and with inlets for ethylene oxide and nitrogen, thermometer well, pressure gauge and safety-valve, together with potassium hydroxide (titre 86%) as a finely ground solid, and in an amount of from 1 to 1.2 parts by weight per each 100 parts by weight of functionalized polymer.

The autoclave is sealed, is purged with nitrogen, and stirring is started, while temperature is increased up to about 150° C. Ethylene oxide is then fed to the autoclave within a time of the order of about 120 minutes, in an amount corresponding to the amount which one wishes to link to the hydroxy groups of the functionalized polymer. During this time interval, a temperature increase up to values of the order of 165–175° C. is observed. At the end of the addition of ethylene oxide, the reaction is allowed to further continue for about 60 minutes. The autoclave is then cooled, and the reaction product is then recovered and is used, without any further treatments, as the additive for coal suspensions in water.

In these reactions, the yield, computed relatively to ethylene oxide fed to the reaction, was always higher than 99%, and the additives listed in Table 2 were prepared. For these additives, by x the average number is indicated of ethylene oxide molecules reacted per each hydroxy group contained in the functionalized polymer used.

EXAMPLE 2

In order to evaluate the additives, concentrated aqueous dispersions of coal are prepared, which contain one of the above mentioned additives, and viscosity measurements are carried out on said dispersions, at several speed gradients, by means of the HAAKE RV 12 rotational viscometer, equipped with an MVI sensor and an M500 measurement head.

More particularly, inside a beaker of 200 ml of capacity, 70 g is weighed of a coal sample, which is previously ground down to a granulometry lower than 250 $\mu$m. An aqueous solution of the additive being tested is then added, so as to have total amounts: of Coal of 70% by weight, of additive of 0.3–1.0% by weight and the residual percentage is constituted by water.

Said mixture is submitted to stirring by means of a stirrer equipped with two metal whips, for 1 minute at 650 rpm, and for 2 minutes at 1,200 rpm.

The so-obtained dispersion is charged to the viscometer, which is at the controlled temperature of 20° C., and after a stay time of 3 minutes, the values of the shear stress are measured at various speed gradients (of from 0 to 150 sec$^{-1}$).

The so-obtained experimental values are processed with the aid of the OSTWALD's power equation:

$$\tau = K \cdot \gamma n$$

wherein:
$\tau$ = shear stress (Pa)
K = consistency index (Pa.sec )
$\gamma$ = speed gradient (sec$^{-1}$)
n = Newtonian behaviour index For each pair of values of $\tau$ and $\gamma$, the values of K and n (OSTWALD's equation) are computed by linear regression. Said values are reported in the following tables. Furthermore, in said tables, the values of apparent viscosity ($\eta_{app}$) are reported as Pa.sec, at 30 and 100 sec$^{-1}$.

A Polish coal is used, which shows the following analysis (referred to dry coal):

| volatile substances | 30.5 |
| ashes | 9.87 |
| fixed carbon (by difference) | 59.98 by weight |

This coal is ground down to the following end granulometry:

| $\mu$m | Retained matter, % |
| --- | --- |
| 1 | 96 |
| 2 | 91 |
| 3 | 87 |
| 4 | 82.5 |
| 6 | 76.5 |
| 8 | 72.1 |
| 10 | 68 |
| 16 | 59.9 |
| 24 | 50.5 |
| 32 | 44 |
| 48 | 35 |
| 64 | 28 |
| 96 | 19 |
| 126 | 12 |
| 180 | 7.5 |
| 192 | 3.0 |
| 250 | 0.0 |

By following the above reported methodology, dispersions are prepared, which contain 70% by weight of ground coal, and 0.3–1.0% by weight of additive, with the balance to 100% being water. The results from the evaluation of these dipersions are reported in Table 3.

TABLE 1

Preparation of OH-Functionalized PMS's

| Sample | PMS used as the starting product (g) | $\overline{M}n$ of the PMS used as the starting product | Cyclohexane (ml) | Mmoles of n-BuLi/TMDA (1:1) | Ratio of the metallating agent to the monomer | n/(n + m) (Degree of functionality) |
|---|---|---|---|---|---|---|
| A | 8.5 | 3 020 | 300 | 72 | 1 | 0.4 |
| B | 10 | 10 750 | 360 | 85 | 1 | 0.4 |
| C | 9.0 | 3 020 | 300 | 38 | 0.5 | 0.35 |
| D | 10 | 10 750 | 360 | 25 | 0.33 | 0.23 |
| E | 20 | 28 230 | 700 | 119 | 0.7 | 0.32 |

TABLE 2

Synthesis of non-ionic dispersants by poly-ethoxylation of OH-functionalized PMS's

| Additive | x (average number of units of ethylene oxide per each OH unit) | Weight ratio of ethylene oxide to OH-functionalized PMS |
|---|---|---|
| A1 | 134 | 17.4 |
| A2 | 211 | 27.3 |
| A3 | 94 | 12.1 |
| B1 | 93 | 12.0 |
| B2 | 133 | 22.2 |
| B3 | 171 | 26.9 |
| C1 | 90 | 10.4 |
| C2 | 135 | 15.6 |
| C3 | 175 | 20.2 |
| D1 | 90 | 7.1 |
| E1 | 135 | 14.4 |
| E2 | 174 | 18.6 |

TABLE 3

| Test Nr. | Additive | Additive concentration | OSTWALD n | OSTWALD K | $\eta_{app}$ (30 sec-1) | $\eta_{app}$ (100 sec-1) |
|---|---|---|---|---|---|---|
| 1 | A1 | 0.5 | 0.788 | 1.107 | 530 | 420 |
| 2 | A1 | 0.7 | 0.803 | 1.044 | 525 | 429 |
| 3 | A1 | 1.0 | 0.822 | 1.112 | 603 | 497 |
| 4 | A2 | 0.5 | 0.847 | 0.897 | 525 | 449 |
| 5 | A2 | 0.7 | 0.798 | 1.118 | 525 | 449 |
| 6 | A2 | 1.0 | 0.825 | 1.370 | 742 | 619 |
| 7 | A3 | 0.5 | 0.835 | 0.766 | 432 | 362 |
| 8 | A1 + A3 | 0.25 + 0.25 | 0.821 | 0.861 | 460 | 384 |
| 9 | B1 | 0.5 | 0.817 | 0.789 | 416 | 346 |
| 10 | B1 | 0.4 | 0.807 | 0.851 | 431 | 356 |
| 11 | B2 | 0.5 | 0.821 | 0.857 | 455 | 381 |
| 12 | B3 | 0.5 | 0.823 | 0.958 | 520 | 428 |
| 13 | B3 | 0.7 | 0.799 | 1.127 | 560 | 458 |
| 14 | C1 | 0.5 | 0.814 | 0.872 | 450 | 373 |
| 15 | C2 | 0.5 | 0.827 | 0.842 | 460 | 383 |
| 16 | C3 | 0.5 | 0.754 | 1.826 | 790 | 581 |
| 17 | D1 | 0.5 | n.d. | n.d. | 6 000 | n.d. |
| 18 | E1 | 0.3 | 0.037 | 133.2 | 4 907 | 1 710 |
| 19 | E2 | 0.5 | 0.283 | 32.04 | 2 830 | 1 130 |

We claim:

1. Dispersions of coal in water, characterized in that they contain from 60 to 75% by weight of coal solids with a particle size generally equal to, or lower than, 300 μm, and from 0.3 to 0.9% by weight of an additive, having the average molecular weight within the range of from 500 to 15,000, represented by the structural formula:

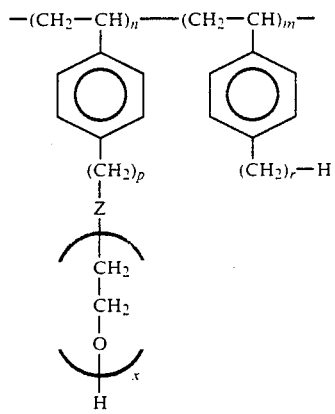

wherein:
Z is either —)— or —NH— or —COO—,
X is an integer within the range of from 60 to 250,
p is an integer within the range of from 0 to 4,
r is an integer within the range of from 0 to 4,
n and m are integers whose sum n+m has a value within the range of from 4 to 128, and for which the ratio of n/(n+m) is within the range of form 0.25 to 0.6,
with the balance to 100% being water.

2. Dispersions according to claim 1, wherein the additive has an average molecular weight within the range of 1,000 to 11,000, the value of the sum of n+m is within the range of from 8 to 93, and the value of the ratio of n/(n+m) is within the range of 0.3 to 0.5.

3. Dispersions according to claim 1, characterized in that the coal solids are contained in an amount of the order of from 68 to 72% by weight, and the additive is contained in an amount within the range of from about 0.4 to 0.7% by weight.

4. Process for preparing an aqueous dispersion of coal solids in water, characterized in that it comprises the following steps:
(a) pregrinding coal under dry conditions in order to produce a preground coal with a maximum particle size of about 6 mm;
(b) wet grinding a portion of the above preground coal, carried out in the presence of an additive, having an average molecular weight within the range of from 500 to 15,000, represented by the structural formula:

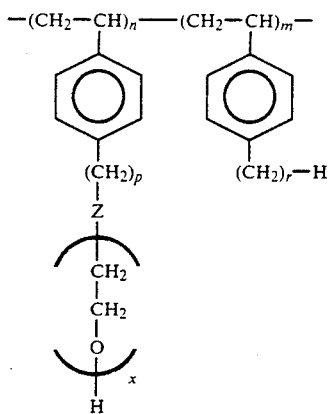

wherein:

Z is either —O— or —NH— or —COO—,

X is an integer within the range of from 60 to 250, p is an integer within the range of from 0 to 6, r is an integer within the range of from 0 to 4, n and m are integers whose sum n+m has a value within the range of from 4 to 128, and for which the ratio of n/(n+m) is within the range of from 0.25 to 0.6;

in order to produce an aqueous dispersion of micronized coal solids with an average size of the particles of the order of from 6 to 12 μm;

(c) adding the residual portion of preground coal to said dispersion and treating the resulting dispersion with a finishing mill.

5. The process according to claim 4, wherein the additive has an average molecular weight within the range of 1,000 to 11,000, the value of the sum of n+m is within the range of 8 to 93, and the value of the ratio of n/(n+m) is within the range of 0.2 to 0.5

6. The process according to claim 4, wherein step (c) is followed by homogenization of the dispersion.

* * * * *

UNITED STATES PATENT AND TRADEMARK OFFICE
CERTIFICATE OF CORRECTION

PATENT NO. : 5,042,990
DATED : August 27, 1991
INVENTOR(S) : Fabrizio Bonaccorsi et al.

It is certified that error appears in the above-identified patent and that said Letters Patent is hereby corrected as shown below:

On the title page:
The first inventor's residence is incorrect, should be,

--Livorno--.

Signed and Sealed this

Sixteenth Day of March, 1993

Attest:

STEPHEN G. KUNIN

*Attesting Officer*     Acting Commissioner of Patents and Trademarks